D. G. FLETCHER.
Heat Radiator.

No. 47,535. Patented May 2, 1865.

Witnesses
C. L. Topliff
Ther Tusch

Inventor
D. G. Fletcher
per Munn & Co
Attorneys

UNITED STATES PATENT OFFICE.

DARIUS G. FLETCHER, OF RACINE, WISCONSIN.

IMPROVED HEAT-RADIATOR.

Specification forming part of Letters Patent No. 47,535, dated May 2, 1865.

*To all whom it may concern:*

Be it known that I, DARIUS G. FLETCHER, of Racine, in the county of Racine and State of Wisconsin, have invented a new and Improved Heat-Radiator; and I do hereby declare that the following is a full, clear, and exact description thereof, which will enable others skilled in the art to make and use the same, reference being had to the accompanying drawings, forming part of this specification, in which—

Figure 1:
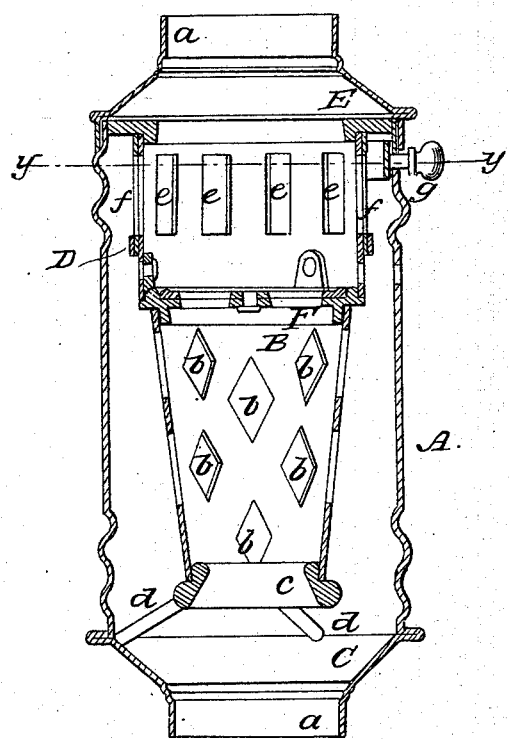
Figure 2:
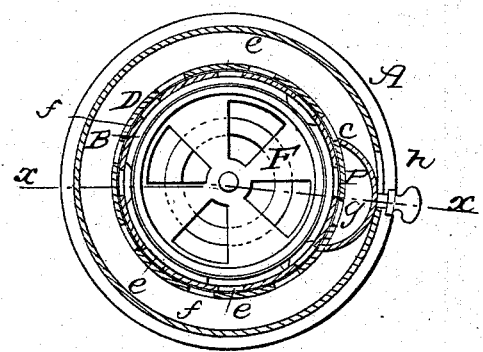

Figure 1 is a vertical central section of my invention, taken in the line $x\ x$, Fig. 2; Fig. 2, a horizontal section of the same, taken in the line $y\ y$, Fig. 1.

Similar letters of reference indicate like parts.

This invention relates to a new and improved heat-radiator for stove-pipes, and is an improvement on a similar radiator, for which Letters Patent were granted to me, bearing date April 17, 1860.

The present invention consists in providing the bottom of the inner chamber of the radiator with a cast-metal base or foot, so formed as to admit of the dropping of soot and ashes from the radiator, so that the latter cannot become choked or clogged up by the former.

The invention also consists in an improvement in the upper register of the inner chamber, whereby the device may be more economically constructed than hitherto.

A represents the external cylinder of my invention, constructed of sheet metal, with a collar, $a$, at each end to receive the joints of a stove-pipe, the cylinder A being considerably larger in diameter than the stove-pipe.

B represents a chamber, which is fitted within the cylinder A, the lower and principal portion of the former being of inverted conical form and perforated with lozenge or other shaped openings $b$, as shown in Fig. 1. The lower end of the chamber B is fitted on a cast metal ring, $c$, having arms $d$, projecting radially from it, the arms resting upon the lower part of the cylinder A, or, rather, upon the upper edge of its flaring or funnel-shaped bottom C, as shown clearly in Fig. 1.

The upper part of the chamber B is of cylindrical form, and it is perforated with rectangular openings $e$, (shown clearly in Fig. 1,) and this cylindrical portion is encompassed by a band, D, having similar perforations, $f$, made in it. The band D is allowed to turn freely on or around the upper part of the chamber B, and it has a rod, $g$, projecting from a bow, $g'$, which is attached to it, said rod passing horizontally out through an oblong slot, $h$, in the cylinder A, by which the band D may be turned. This perforated band D and the perforations in the upper part of the chamber B form a register. The chamber B is considerably smaller in diameter than the cylinder A, and the upper end of the space between the chamber and cylinder is covered or closed by a cast-iron ring, E, (shown in Fig. 1.) Within the chamber B, at the lower part of the cylindrical portion thereof, there is a register, F. (Shown in both figures.)

From the above description it will be seen that when the register F is open there will be a direct draft up through the chamber B, and when said register is closed the products of combustion will pass up through the space between the chamber B and cylinder A, and through the perforations $b$ of the chamber B into said space, and through the perforations $e\ f$ of the upper register into the upper part of B, and thence up the stove-pipe, the draft being controlled, as desired, by adjusting the band D. When the register F is closed, heat is radiated from the cylinder A. In consequence of having the chamber B supported within the cylinder A by means of the cast-iron ring $c$ and arms $d$, a free space is allowed for the descent of the soot and ashes, which would otherwise accumulate in the radiator and eventually choke or clog up the latter.

By having the perforations $e\ f$ in the upper part of the chamber B and band D of rectangular form, as shown, a saving is effected in labor, and by having the upper end of the space between the chamber B and the cylinder A closed by a cast-iron ring, E, the radiator is rendered durable, far more so than when a sheet-metal ring or cover is used.

The cast-iron rings c and E preserve the apparatus from burning out and add much to its strength and durability.

I claim as new and desire to secure by Letters Patent—

1. The cast-iron ring c and arms d for supporting the chamber B within the case A, substantially as and for the purpose specified.

2. The rectangular openings e f of the upper register of the chamber B, for the purpose of facilitating the construction of the device.

3. The cast-iron ring or cover E for the space between the chamber B and cylinder A, as set forth.

DARIUS G. FLETCHER.

Witnesses:
  H. LYNCH,
  D. McDONALD.